US006765851B2

United States Patent
Kawashima et al.

(10) Patent No.: US 6,765,851 B2
(45) Date of Patent: Jul. 20, 2004

(54) OPTICAL DISC, DATA-RECORDING APPARATUS AND DATA-RECORDING METHOD

(75) Inventors: Tetsuji Kawashima, Kanagawa (JP); Futoshi Tsukada, Kanagawa (JP); Kunihiko Miyake, Kanagawa (JP); Shinji Ohta, Kanagawa (JP); Masazumi Shiozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 09/817,304

(22) Filed: Mar. 26, 2001

(65) Prior Publication Data

US 2001/0040846 A1 Nov. 15, 2001

(30) Foreign Application Priority Data

Mar. 28, 2000 (JP) .................................... P2000-093007

(51) Int. Cl.[7] ................................................ G11B 7/00
(52) U.S. Cl. ................ 369/47.53; 369/53.2; 369/275.3; 369/275.4
(58) Field of Search ......................... 369/47.22, 47.38, 369/47.39, 47.5, 47.53, 53.2, 53.22, 275.2, 275.3, 275.4, 13.26, 13.27, 116

(56) References Cited

U.S. PATENT DOCUMENTS 5,305,296 A * 4/1994 Kono ....................... 369/47.53
5,351,226 A * 9/1994 Mizumoto et al. ........ 369/47.39
5,592,463 A * 1/1997 Muramatsu et al. ...... 369/47.53

* cited by examiner

Primary Examiner—Thang V. Tran
Assistant Examiner—Bach Vuong
(74) Attorney, Agent, or Firm—Jay H. Maioli

(57) ABSTRACT

An optical disc having a power calibration area for calibrating the power of a data recording laser beam. The power calibration area is provided at an inner peripheral part of the disc and has test areas and count areas. The test areas are provided to accomplish trial writing of data, and the count areas are provided to record data representing the use condition of the test areas. Data is recorded on the optical disc, while calibrating the data recording laser beam. The number of the test areas is increased in accordance with an increase in the recording density of the optical disc. The optical disc may be a double-density CD. In this case, the disc has 800 to 1200 test areas. The test areas have the smallest possible size, and the count areas are provided in the smallest possible number. Therefore, the disc can have sufficiently large data regions. Thus, the power of the data recording laser beam can be therefore adjusted many times. The amount of data that can be recorded on the optical disc therefore increase.

26 Claims, 8 Drawing Sheets

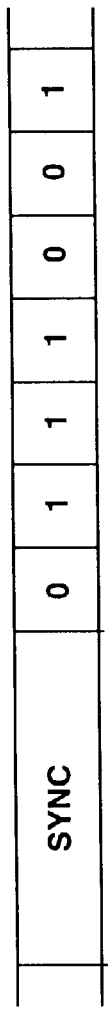
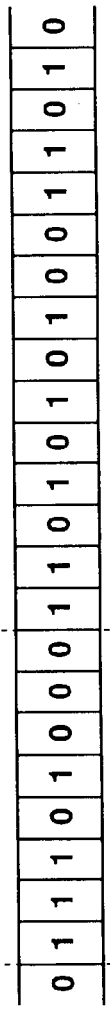
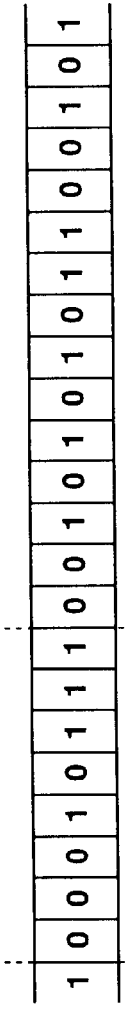
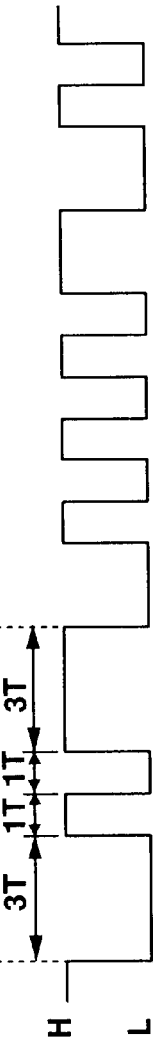
FIG.5A
FIG.5B
FIG.5C
FIG.5D
FIG.5E

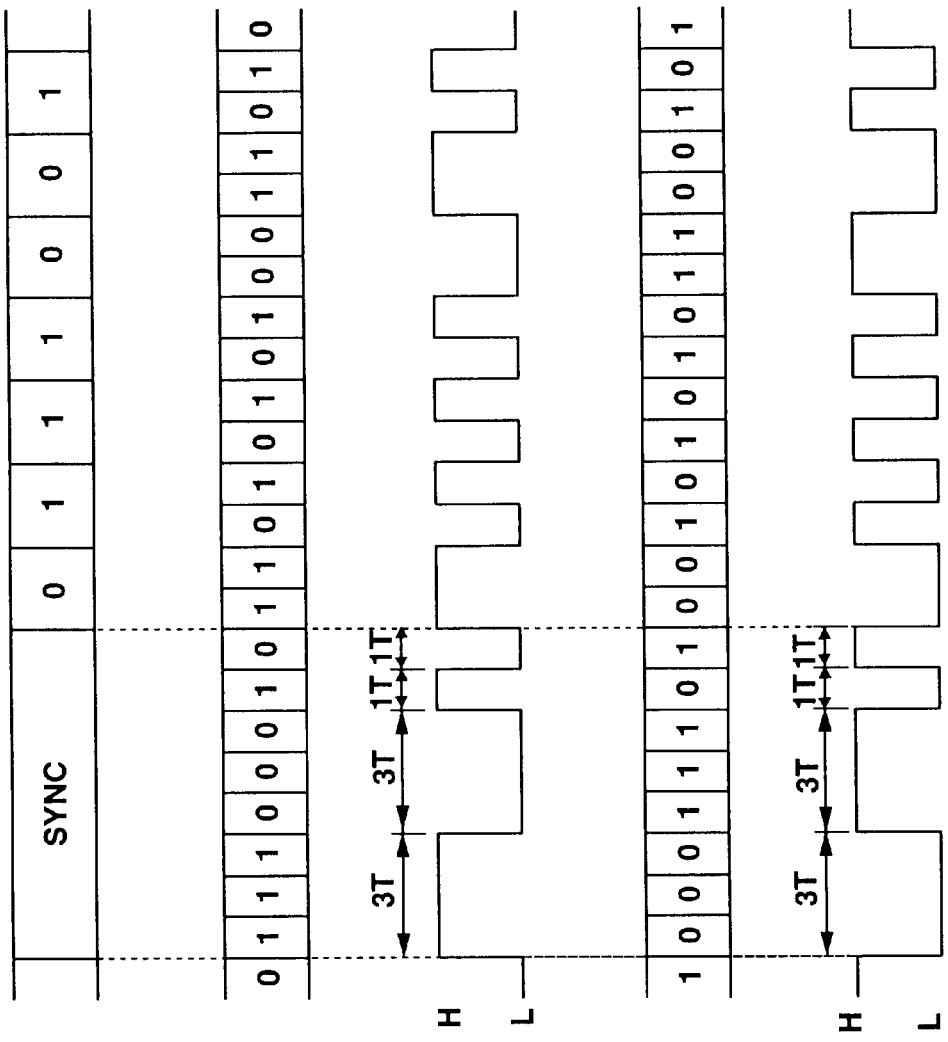

OPTICAL DISC, DATA-RECORDING APPARATUS AND DATA-RECORDING METHOD

BACKGROUND OF THE INVENTION

The present invention relates to an optical disc such as so-called CD-R or so-called CD-RW (CD-Rewritable), on which data can be recorded, and to an apparatus and method for recording data on the optical disc.

An optical disc is a disc-shaped recording medium that has a signal-recording layer. When a light beam is applied to the signal-recording layer, data signals are recorded on the disc or reproduced therefrom. (Hereinafter, the operation of recording data on or reproducing data from the disc will be referred to as "recording/reproducing.")

Among such optical discs are playback-only discs, each comprising a substrate on which data signals have been recorded in the form of pits. Examples of playback-only discs are CD (Compact Disc) and CD-ROM (CD-Read Only Memory). In the case of a playback-only disc, the major surface of the substrate, in which the trains of pits are formed, functions as the signal-recording layer.

There is a demand for an optical disc on which new data can be written or the data can be rewritten. To meet the demand, a new type of an optical disc has been developed, which may be used in the so-called compact disc recorder system and on which additional data signals can be recorded. (Hereinafter, the compact disc of this type will be referred to as "CD-R.") The CD-R has a signal-recording layer on which data signals can be recorded. The signal-recording layer is made of material the major component of which is an organic dye. When a light beam is applied to the signal-recording layer, the reflectance of the layer changes at the part irradiated with the light beam. A data signal is thereby recorded on the disc. The reflectance of that part of the layer is detected, thereby reproducing the data signal.

Another type of an optical disc on which data can be recorded is, for example, a CD-RW (CD-Rewritable). The CD-RW is a phase-change optical disc, on which data can be rewritten by using the phase changes in the signal-recording layer.

The CD-R and CD-RW each have a] lead-in area. The lead-in area includes an area called "PCA (Power Calibration Area), which is used to adjust the power for the data-recording beam.

The PCA consists of two types of areas, i.e., test area and count area. Signals are recorded in test area, and the asymmetry of the signals recorded is measured to find the optimal power for the data-recording beam.

The test area and the count area take one-to one relation. In the case of the conventional CD-R or CD-RW of the single-density CD format, the PCA consists of 100 test areas and 100 count areas. Each test area is paired with one count area.

In recent years, the amount of data processed in, for example, personal computers has been increasing. It is desired that CD-Rs and CD-RWs used as recording media for recording such data should have a large storage capacity.

In an optical disc having such a large storage capacity, the number of times the power can be adjusted may be insufficient if the PCA consists of only 100 test areas and only 100 count areas. Hence, the amount of data that can be recorded on the optical disc may be limited.

BRIEF SUMMARY OF THE INVENTION

The present invention has been made in view of the foregoing. An object of the invention is to provide an optical disc in which the power can be adjusted a sufficient number of times and the storage capacity of which can be increased. Another object of the invention is to provide a data-recording apparatus and data-recording method, either using the optical disc.

To achieve the first object of the invention, an optical disc according to the invention has a power calibration area for calibrating the power of a data-recording laser beam. The power calibration area is provided at an inner peripheral part of the disc and has test areas and count areas. The test areas are provided to accomplish trial writing of data. The count areas are provided to record data representing the use condition of the test areas, and the number of the test areas is increased in accordance with an increase in the recording density and storage capacity of the optical disc.

The optical disc may be CD-formatted and may have a recording density about twice as high as that of an optical disc of the existing CD format (e.g., single-density CD-R). The optical disc may have 800 to 1200 test areas that are provided in the power calibration area.

A data recording apparatus according to the invention is designed to record data on an optical disc by calibrating the power of a data-recording laser beam. The optical disc has a calibration area which is provided at an inner peripheral part of the disc and which has test areas and count areas. The test areas are provided to accomplish trial writing of data. The count areas are provided to record data representing the use condition of the test areas. The number of the test areas is increased in accordance with an increase in the recording density and storage capacity of the optical disc.

Since the number of the test areas is increased in proportion to the recording density and storage capacity of the optical disc, the power of the data-recording laser beam can be adjusted many times. Therefore, the amount of data that may be recorded on the optical disc is not limited at all.

Moreover, the size of the test areas may be reduced to, for example, one equivalent to two ATIP information frames recorded in a pregroove made in one surface of the disc. In this case, the disc can have sufficiently large data regions.

A data recording method according to this invention is designed to record data on an optical disc by calibrating the power of a data-recording laser beam. The optical disc has a calibration area provided at an inner peripheral part of the disc. The calibration area has test areas for accomplishing trial writing of data and count areas for recording data representing the use condition of the test areas. The number of the test areas is increased in accordance with an increase in the recording density of the optical disc.

In the method, the number of the test areas is increased in proportion to the recording density and storage capacity of the optical disc. The power of the data-recording laser beam can be therefore adjusted many times. As a result, the amount of data that may be recorded on the optical disc is not limited at all.

In addition, the size of the test areas may be reduced to, for example, one equivalent to two ATIP frames recorded in a pregroove made in one surface of the disc. Thus, the disc can have sufficiently large data regions.

As seen from the above, the number of test areas provided on the disc is increased in proportion to the increase in the storage capacity of the disc. This makes it possible to adjust the power of the data-recording laser beam as many times as desired. Thus, the amount of data that may be recorded on the optical disc is not limited at all.

Moreover, the test areas provided on the disc have the smallest possible size (e.g., the size equivalent to two ATIP frames recorded in the pregroove), and the count areas are provided on the disc in the smallest possible number. Therefore, the disc can have sufficiently large data regions.

BRIEF DESCRIPTION OF THE SEVERAL VIEWS OF THE DRAWING

FIGS. 5A to 5E are diagrams showing a synchronization signal that is contained in an ATIP wobble signal recorded on a single-density CD-R; FIG. 5A showing the ATIP wobble signal, FIG. 5B depicting a channel bit pattern that follows a channel bit "0" FIG. 5C showing a bi-phase signal that corresponds to the channel bit pattern shown in FIG. 5B, FIG. 5D illustrating a channel bit pattern that follows a channel bit 1, and FIG. 5E depicting a bi-phase signal that corresponds to the channel bit pattern shown in FIG. 5D;

FIGS. 6A to 6E are diagrams showing a synchronization signal for an ATIP wobble signal recorded on a double-density CD-R; FIG. 6A showing the ATIP wobble signal, FIG. 6B depicting a channel bit pattern that follows a channel bit "0" FIG. 6C showing a bi-phase signal that corresponds to the channel bit pattern shown in FIG. 6B, FIG. 6D illustrating a channel bit pattern that follows a channel bit "1," and FIG. 6E depicting a bi-phase signal that corresponds to the channel bit pattern shown in FIG. 6D;

DETAILED DESCRIPTION OF THE INVENTION

Embodiments of this invention, including an optical disc and a method of recording data on the optical disc, will be described in detail, with reference to the accompanying drawings.

An optical disc according to the invention is a double-density CD-R, the format of which will be described first.

The various format items of CD-Rs are standardized as is detailed in the so-called Orange Book Part II. Here, only the basic structure of CD-Rs and the differences between the CD-R (single-density CD-R) and the double-density CD-R, both available at present, will be explained.

Figure 1:
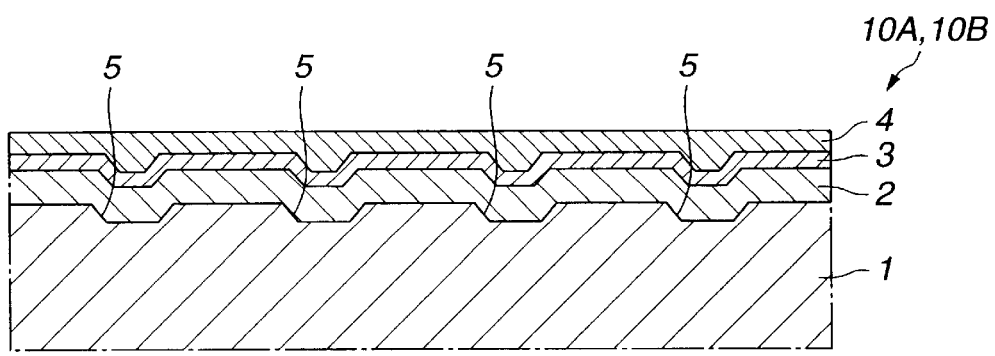
FIG. 1 is a sectional view showing a major part of a CD-R.

As shown in FIG. 1, both a single-density CD-R 10A and a double-density CD-R 10B comprises a substrate 1, a recording layer 2, a reflection film 3, and a protective film 4. The substrate 1 is a disc made of resin such as poly (methyl methacrylate) (PMMA) or polycarbonate (PC) and has a diameter of 120 mm and a thickness of 1.2 mm. The recording layer 2 is formed on the substrate 1 by means of spin coating and made of material composed mainly of organic dye. The reflection film 3 is formed on the recording layer 2 and made of, for example, gold (Au) or silver (Ag). The protective film 4 is formed on the reflection film 3 by spin coating and made of, for example, ultraviolet-curing resin.

A laser beam modulated by data to be recorded on the CD-R 10A or 10B (hereinafter referred to as "record data") is applied to the recording layer 2. Any part of the layer 2 that has been irradiated with the laser beam interacts with the substrate 1. A train of pits, which corresponds to the data, is thereby formed at the interface between the substrate 1 and the recording layer 2. To read the data from the CD-R 10A or 10B, a data-reading laser beam is applied to the pits. The beam reflected from the pits indicates the reflectance changes at the pits. Thus it is possible to read the data from the CD-R 10A or 10B.

Figure 2A:
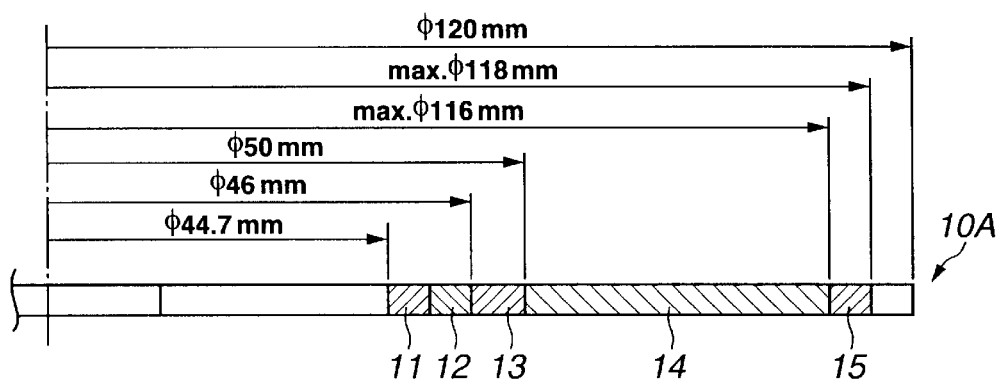
FIG. 2A shows the layout of the data-recording region of a single-density CD-R.
Figure 2B:
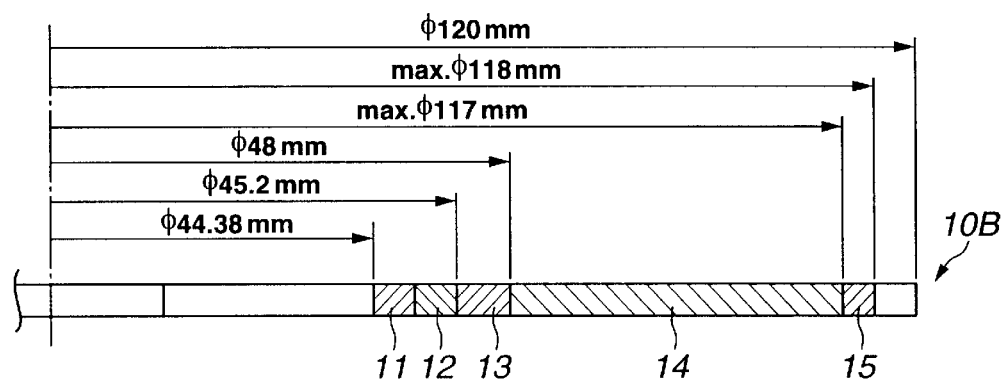
FIG. 2B depicts the layout of the data-recording region of a double-density CD-R.

FIG. 2A shows the layout of the data-recording region of the CD-R 10A. FIG. 2B depicts the layout of the data-recording region of the CD-R 10B. As FIGS. 2A and 2B show, either CD-R has a PCA (Power Calibration Area) 11, a PMA (Program Memory Area) 12, a lead-in area 13, a program area 14, and a lead-out area 15. The PCR 11, PMA 12, lead-in area 13, program area 14 and lead-out area 15 are concentric and arranged from the center to the periphery of the disc in the order they are mentioned.

The PCA 11 is provided to calibrate the power of the data-recording laser beam. The PCA 11 has a test area and a count area. The test area is used to accomplish trial writing of data. The count area is provided to record the data representing the use condition of the test area. The PMA 12 is a region in which the mode of the data recorded, the position at which the recording of data is started and position at which the recording of data is terminated are temporarily stored for each track. The PCA 11 and the PMA 12 are regions that are used only when data is recorded on the CD-R. An optical pickup would not access to the PCA 11 or the PMA 12 once finalization is effected, thereby writing data in the lead-in area 13 or the lead-out area 15.

The lead-in area 13 is a region that is to read data from the program area 14. Information such as TOC (Table of Contents) is recorded in the lead-in area 13. To reproduce data from the CD-R, the TOC is read from the lead-in area 13. Once the TOC is thus read, the optical pickup can quickly access to any desired track.

The program area 14 is a region in which data is recorded. The area 14 has at most 99 logic tracks in the case of the single-density CD-R 10A, and at most 159 logic tracks in the case of the double-density CD-R 10B.

The lead-out area 15 is a region in which various data items about the disc are recorded. The lead-out area 15 functions as a buffer region, too, which prevents the over-running of the optical pickup provided in an optical disc drive.

The various areas provided on the single-density CD-R 10A are positioned as shown in FIG. 2A. That is, the lead-in area 13 is positioned, with its inner and outer circumferences having diameters of 46 mm and 50 mm, respectively. The program area 14 is located, with its inner and outer circumferences having diameters of 50 mm and 116 mm at most, respectively. The lead-out area 15 is positioned, with its inner and outer circumferences having diameters of 116 mm and 118 mm at most, respectively. The PCA 11 and the PMA 12 are provided nearer to the center of the disc than the lead-in area 13. Note that the innermost circumference of the PCA 11 has a diameter of 44.7 mm.

The various areas on the double-density CD-R 10B are positioned as shown in FIG. 2B. That is, the lead-in area 13 is positioned, with its inner and outer circumferences having diameters of 45.2 mm and 48 mm, respectively. The program area 14 is located, with its inner and outer circumferences having diameters of 48 mm and 117 mm at most, respectively. The lead-out area 15 is positioned, with its inner and outer circumferences having diameters of 117 mm and 118 mm at most, respectively. The PCA 11 and the PMA 12 are provided nearer to the center of the disc than the lead-in area 13. Note that the innermost circumference of the PCA 11 has a diameter of 44.38 mm.

The double-density CD-R 10B is compatible with the single-density CD-R 10A and is, nonetheless, has the largest possible program area 14. The CD-R 10B not only has a higher recording density than the single-density CD-R 10A, but also does it have its program area 14 enlarged, while remaining compatible with the single-density CD-R 10A. Thus, the storage capacity of the double-density CD-R 10B is increased to a maximum.

Figure 3:
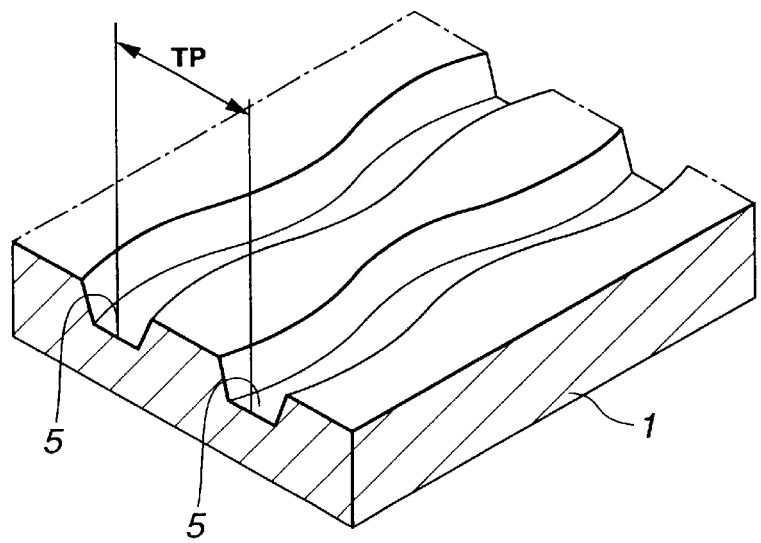
FIG. 3 is a magnified perspective view illustrating a part of the substrate of the CD-R.

As shown in FIGS. 1 and 3, both CD-Rs 10A and 10B have, for example, a spiral wobbling groove 5 made in the surface of the substrate 1. That part of the recording layer 2, which aligns with the wobbling groove 5, is a spiral recording track. It is on the recording track that EF-modulated signals (EFM signals) are recorded. In either type of a CD-R, the intervals at which the turns of the wobbling groove 5 are the track pitch TP as is illustrated in FIG. 3. The single-density CD-R 11A has a track pitch TP of 1.6±0.02 μm. The double-density CD-R 10B has a track pitch TP of 1.1±0.02 μm. Having a shorter track pitch TP than the single-density CD-R 10A, the double-density CD-R 10B has a higher recording density.

The double-density CD-R 10B has not only a short track pitch TP but also a high linear density, i.e., the density at which data is recorded along the recording track. More precisely, the shortest pit length (3T) is about 0.62 μm in the double-density CD-R 10B, whereas the shortest pit length (3T) is about 0.83 μm in the single-density CD-R 10A.

In the double-density CD-R 10B, the track pitch TP is decreased as described above, and the recording density is thereby increased about twice as much as that of the single-density CD-R 10A. Hence, the double-density CD-R 10B can record about twice as much data as the single-density CD-R 10A. To be more specific, the double-density CD-R 10B can record 1 GB or more.

The track pitch TP of either type of a CD-R, 10A or 10B, can be set at an appropriate value, by adjusting the feed rate applied in forming a latent image of the wobbling groove 5 on the resist film provided on the glass substrate in the process of manufacturing the master plate. In other words, the spiral track can have an appropriate pitch TP by adjusting the distance by which a beam spot is moved in the radial direction of the glass substrate each time the glass substrate is rotated 360°. More specifically, the single-density CD-R 10A attains a track pitch TP of 1.6±0.02 μm setting the feed rate at the value of 1.6±0.02 μm/rotation in the process of manufacturing the master plate. The double-density CD-R 10B attains a track pitch TP of 1.1±0.02 μm setting the feed rate at the value of 1.1±0.02 μm/rotation in the process of manufacturing the master plate.

The linear density of either type of a CD-R can be changed by adjusting the linear velocity at which the CD-R is rotated in the process of recording data. That is, the single-density CD-R 10A is rotated at a linear velocity of 1.2±0.02 m/sec to record data. On the other hand, the double-density CD-R 10B is rotated at a linear velocity of 0.9±0.02 m/sec to record data.

The wobbling groove 5 wobbles a little, drawing gentle sine waves. Since the groove 5 wobbles in this manner, FM-modulated position data, or time-axis data representing absolute positions on the disc, is recorded as an ATIP (Absolute Time In Pregroove) wobble signal.

The ATIP wobble signal is recorded such that it has a center frequency of, for example, 22.05 kHz when the CD-R is rotated at a predetermined velocity. Each sector of the ATIP wobble signal has the same size as one data sector (2352 bytes) of each sector of the record data. Thus, the sectors of the record data are written on the disc in synchronism with the sectors of the ATIP wobble signal.

Figure 4:
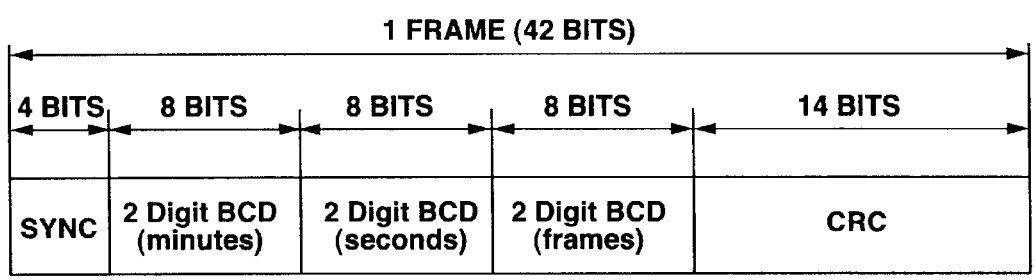
FIG. 4 is a diagram representing the frame structure of an ATIP wobble signal.

FIG. 4 illustrates the frame structure of the ATIP wobble signal. As shown in FIG. 4, one frame of the ATIP wobble signal consists of 42 bits. The first four bits constitutes a synchronization signal SYNC. The next 24 bits form three 2-digit BCDs that are time-axis data items "minutes," "seconds" and "frames," each consisting of eight bits. The last 14 bits of the frame constitute a CRC (Cyclic Redundancy Code). Thus, one frame is composed of a synchronization signal SYNC, three 2-digit BCDs and a CRC.

FIGS. 5A to 5E depict the pattern of the synchronization signal SYNC in the ATIP wobble signal recorded on the single-density CD-R 10A.

FIG. 5A shows the ATIP wobble signal. When subjected to bi-phase modulation, the ATIP wobble signal acquires the channel bit pattern shown in FIG. 5B or the channel bit pattern shown in FIG. 5D. If the bit immediately preceding the synchronization signal SYNC is a channel bit "0," the signal SYNC attains the channel bit pattern "11101000" shown in FIG. 5B. In this case, the bi-phase signal generated when the ATIP wobble signal is subjected to bi-phase modulation has the waveform shown in FIG. 5C. If the bit immediately preceding the signal SYNC is a channel bit "1," the signal SYNC attains the channel bit pattern "00010111" shown in FIG. 5D. In this case, the bi-phase signal generated when the ATIP wobble signal is subjected to bi-phase modulation has the waveform shown in FIG. 5E. That is, the signal SYNC contained in the ATIP wobble signal recorded on the single-density CD-R 10A has a pattern defined by two 3T waveforms of the opposite polarities and one 1T waveform connecting the two 3T waveforms.

FIGS. 6A to 6E show the pattern of the synchronization signal SYNC in the ATIP wobble signal recorded on the double-density CD-R 10B.

FIG. 6A shows the ATIP wobble signal recorded on the CD-R 10B. When subjected to bi-phase modulation, this ATIP wobble signal acquires the channel bit pattern shown in FIG. 6B or the channel bit pattern shown in FIG. 6D. If the bit immediately preceding the synchronization signal SYNC is a channel bit "0," the signal SYNC attains the channel bit pattern "11100010" shown in FIG. 6B. If so, the bi-phase signal generated when the ATIP wobble signal is subjected to bi-phase modulation has the waveform shown in FIG. 6C. If the bit immediately preceding the signal SYNC is a channel bit "1", the signal SYNC attains the channel bit pattern "00011101" shown in FIG. 6D. In this case, the bi-phase signal generated when the ATIP wobble signal is subjected to bi-phase modulation has the waveform shown in FIG. 6E. Thus, the signal SYNC contained in the ATIP wobble signal recorded on the double-density CD-R 10B consists of 3T waveforms of one polarity and 3T waveforms of the other polarity, which constitute a continuous pattern.

As indicated above, the single-density CD-R 10A and the double-density CD-R 10B differ in the pattern of the synchronization signal SYNC contained in the ATIP wobble signal. Hence, whether the disc set in the optical disc drive is the CD-R 10A or the CD-R 10B can be determined the moment the ATIP wobble signal is detected and the synchronization signal is read from the ATIP wobble signal.

The CD-R 10A and 10B have an area called PCA each, as described above. The PCA is provided nearer to the center of the disc than the lead-in area 13, to calibrate the power of the data-recording laser beam.

In the present invention, the PCA is designed in a specific way, so that the recording density may be increased. The PCA will be described below in detail.

Figure 7:
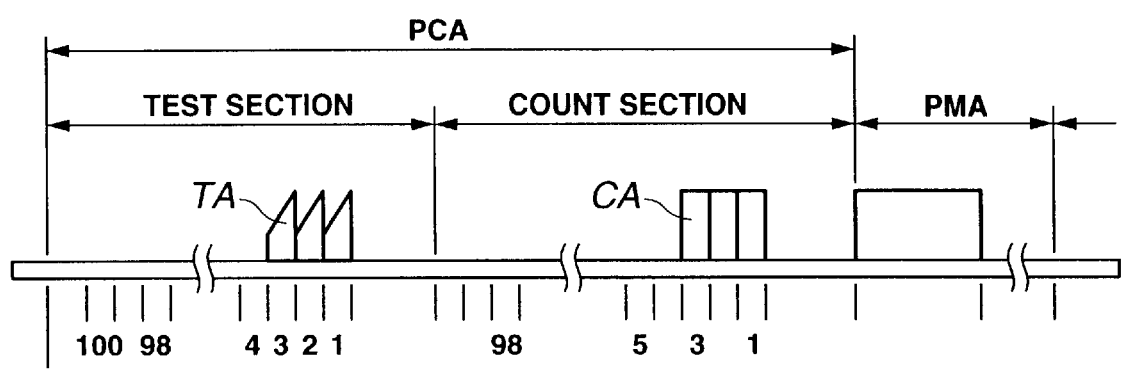
FIG. 7 is a diagram illustrating the PCA of a conventional CD-R.

As shown in FIG. 7, the PCA is composed of two sections. The first section is a test section. The second section is a count section. The test section consists of test areas TA. The count section consists of count areas CA. Each test area TA is a region in which data is written on trial and the symmetry of the signals recorded is measured to find the optimal power for the data-recording laser beam. The test areas TA have a size equivalent to 15 ATIP frames. One ATIP frame has a size that corresponds to one frame of the absolute time data recorded in the form of a pregroove. Fifteen ATIP frames is an amount of data equivalent to 15 frames of the absolute time data.

Each count area CA is a region that indicates whether the corresponding test area is used or not. The count areas CA have a size equivalent to one ATIP frame. Random data is recorded in each count area CA when the test area corresponding to the count area CA is used. The random data, thus recorded, is utilized to search for any test area not used yet, in order to adjust the power for the data-recording laser beam.

The test areas and the count areas are in one-to-one relationship. In the single-density CD-R 10A that is available at present, the PCA has 100 test areas and 100 count areas. Generally, one test area and the corresponding count area are used to adjust the power of the data-recording laser beam each time. If the power cannot be adjusted for some reason, several test areas and the corresponding count areas may be used until the power is adjusted as desired. Since the PCA has 100 test areas and 100 count areas, the power of the data-recording laser beam can be adjusted 100 times at most.

The PCA has 100 test areas and 100 count areas, because the CD-R first developed has 99 tracks at most, each track defining the minimum unit of data that may be recorded on the CD-R.

The development of the CD-R is followed by the so-called packet-writing system that records data in units of packets, each smaller than the amount of data that is recorded in one track. In the packet-writing system, data is recorded in the form of 100 packets or more. Hence, the power for the data-recording laser beam may need to be adjusted 100 times or more, in view of the format of the CD-R.

The PCA on a CD-RW can be erased and used again. The PCA on a CD-R cannot be used again. In a CD-R, data cannot be recorded in areas, if any, that are not used yet, because the number of times the power can be adjusted is limited.

A method of solving this problem is described in the Orange Book. The method is to partition the test area, which has a size equivalent to 15 ATIP frames, into some sectors. The sectors defined by the sub-partition are used to adjust the power of the data-recording laser beam.

Figure 8:
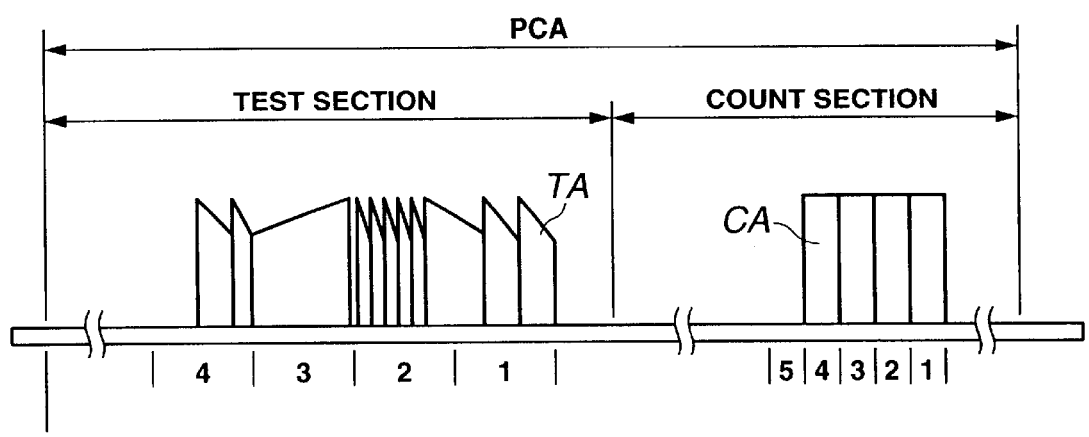
FIG. 8 is a diagram depicting a PCA in which the test area is divided into some sectors.

FIG. 8 depicts an example of a PCA in which the test area is divided into some sectors. Trial writing of data in each test area can be performed in any desired pattern and any desired number of ATIP frames. In order to facilitate the detection of the end of the test area, however, the data should be written on trial in such a way that the laser beam power may have the maximum power at the end of the test area.

The Orange Book teaches that the test area may have the smallest size of one ATIP frame. Assume that a test area consisting of 15 ATIP frames is divided into five test areas, each composed of three ATIP frames. If this is the case, it is possible to adjust the power 500 times (=15/3×100) at most. Now that each test area consists of three ATIP frames, there are five test areas for one count area. There is no longer the one-to-one relationship between the test areas and the count areas. Any count area can no longer designate the head of the corresponding test area that has not been used yet. In this case, each count area can but roughly designates the head of the corresponding test area, and the head of the test area is accurately designated by the method called "search," i.e., physical detection of signals already recorded. In this method, the last count area recorded is detected, and the test area corresponding to this count area is searched for empty regions. Data is then written on trial in an empty region, if found in the count area. Once data has been written on trial in at least one part of the test area, the data showing that the test area has been already used is recorded in the corresponding count area.

The PCAs of the double-density CD-R 10B must be formatted to satisfy the following two requirements:

(1) Any PCA that cannot be used for recording user data should be as small as possible in order to increase the storage capacity for the user data.

(2) The number of times the power of the data-recording laser beam can be adjusted should be increased, because the CD-R 10B has a storage capacity twice as large as that of the single-density CD-R 10A.

In the present invention, the test areas TA consist of 2 ATIP frames each, to meet the requirement (1). The test areas are smaller by one ATIP frame than the above-mentioned test areas, each composed of three ATIP frames.

Trial writing of data is performed in the test areas, while repeatedly changing the power of the data-recording laser beam. Each test area needs to be long enough to provide a sufficient period within which the laser beam acquires a stable intensity. The period depends on the APC (Automatic Power Control) band. The higher the APC band, the shorter the period. If the APC band is too high, however, the jitter in any signal recorded will increase. The rotation speed of the disc is ever increasing to record data at higher densities. The period is actually decreasing, also for test areas consisting of one ATIP frame each. At present, a test area composed of two ATIP frames is the smallest one for which the power of the laser beam can be adjusted.

To satisfy the above-mentioned requirement (2), the power of the laser beam can be adjusted 1000 times in the present invention. This number of times is twice as many as the times (500) the power can be adjusted in the case where each test area consisting of 15 ATIP frames is divided into five test areas, each composed of three ATIP frames. The number of test areas is increased twice, too, because the storage capacity of the disc has increased twice as much. Since the number of time the power of the laser beam can be adjusted has increased, the amount of data that may be recorded on the optical disc is not limited at all.

Although the storage capacity has increased twice, the number of test areas need not be increased twice. The number of test areas can be smaller or greater by 20% in practice. Thanks to the tolerance of 20%, the number of test areas can range from 800 to 1200.

The number of count areas is not 1000, but 200 or a fifth the number of test areas provided. In other words, each count area corresponds to five test areas. The head of any one of the five test areas, which has not been not used yet, can therefore be found by searching the count area corresponding to these five test areas. Thus, it is sufficient for the count area to designate any test area that has not been used.

Figure 9:
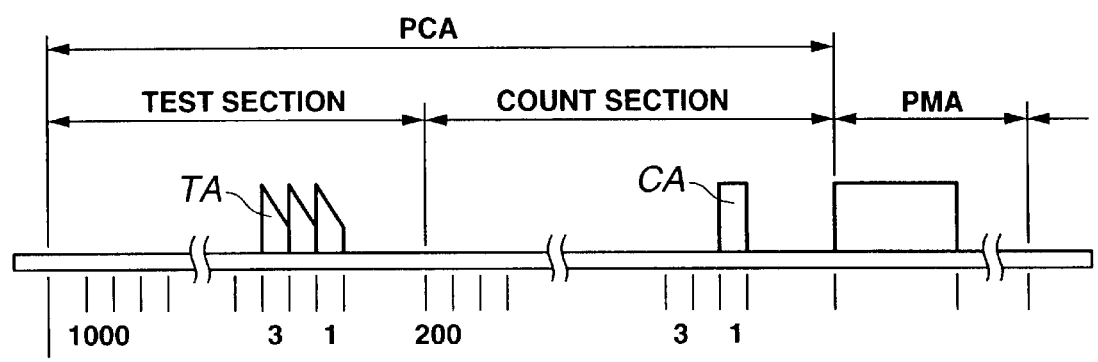
FIG. 9 is a diagram showing the PCA of a double-density CD-R according to this invention.

FIG. 9 shows the PCA of the double-density CD-R 10B according to this invention. Having this PCA, the CD-R 10B meets both requirements (1) and (2) pointed out above.

As described above, five test areas are provided for one count area in the present embodiment. In some cases it may be necessary to reduce the number of count areas. If so, more test area may be provided for one count area. In this regard it should be noted that about 32 ATIP frames are arranged in one circle for some test areas. (This is because the frequency of ATIP frames is 75 Hz in the case where the disc is rotated at 140 rpm.) This number of ATIP frames corresponds to about 16 test areas. Hence, so long as the number of test areas for one count area remains an integer ranging from 1 to 16, the head of any test area not used yet can be found if the optical pick is moved to that test area after detecting the count area. This means that the count area performs its function effectively.

To search for any test area not used yet, after finding the corresponding count area, the number of count areas counted must be multiplied by the number of test areas corresponding to one count area. To simplify the multiplication it desired that the number of test areas be the second power to 2, 4, 8 or 16.

A method of recording data on a double-density CD-R 10B, according to the invention, will be described.

Figure 10:
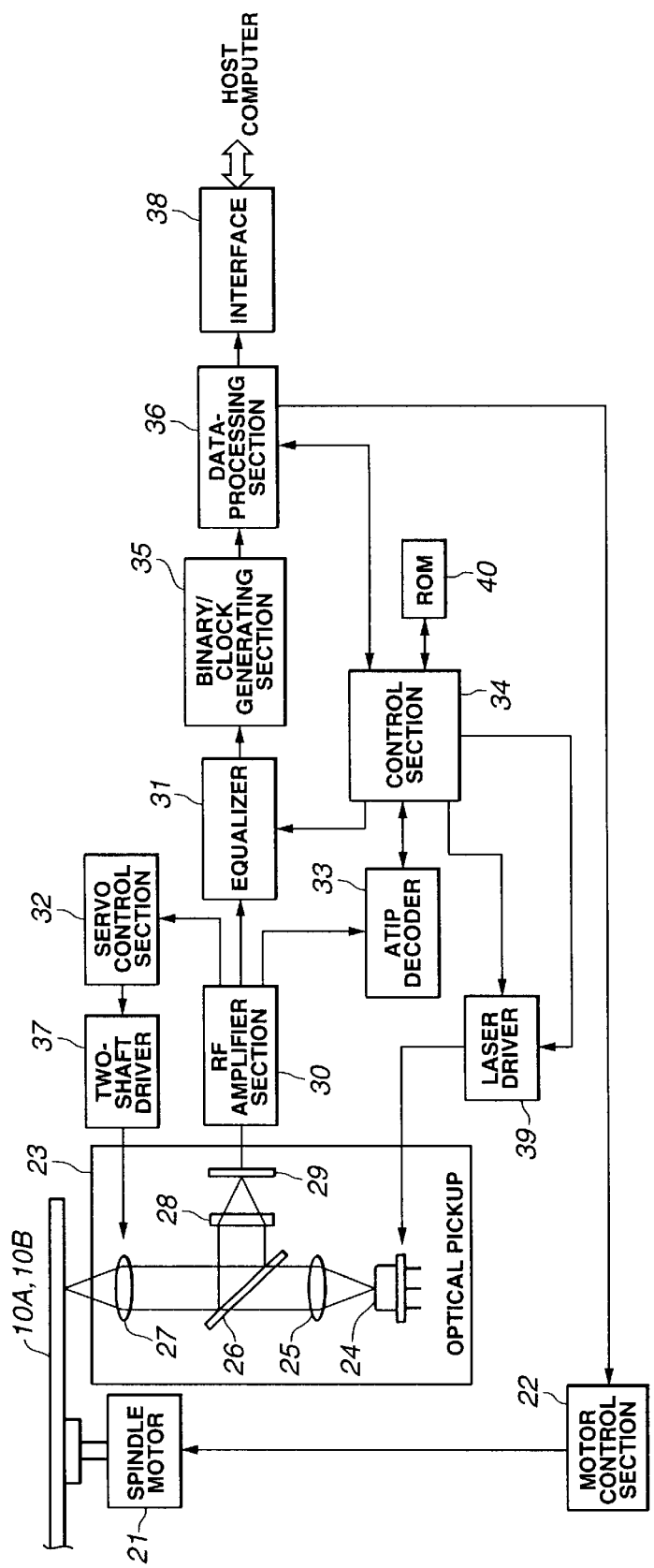
FIG. 10 is a block diagram of an optical disc drive according to the present invention.

FIG. 10 illustrates an optical disc drive 20 according to the invention, which is designed to record data on CD-Rs and reproduce the data from CD-Rs.

As shown in FIG. 10, the optical disc drive 20 has a spindle motor 21. A recording medium, either the single-density CD-R 10A or the double-density CD-R 10B, is attached to the shaft of the spindle motor 21.

As FIG. 10 shows, the optical disc drive 20 comprises a motor control section 22 and an optical pickup 23. The motor control section 22 controls the spindle motor 21. When controlled, the spindle motor 21 rotates the optical disc set in the optical disc drive 20. More specifically, the motor 21 rotates the optical disc at CLV (Constant Linear Velocity) of 1.2±0.02 m/sec if the disc is the single-density CD-R 10A or at CLV of 0.9±0.02 m/sec if the disc is the double-density CD-R 10B.

The optical pickup 23 applies a light beam to the CD-R that the spindle motor 21 is rotating, and detects the light that has been reflected from the CD-R. As shown in FIG. 10, the optical pickup 23 comprises a semiconductor laser 24, a collimator lens 25, a beam splitter 26, an objective lens 27, a condensing lens 28, and a photodetector 29. The semiconductor laser 24 emits a light beam having a wavelength of 780 nm. The collimator lens 25 receives the light beam from the laser 24 and converts the same to a parallel beam. The beam splitter 26 splits the parallel beam into two light beams. The objective lens 27 has a numerical aperture NA of 0.5±0.01 or 0.55±0.01. The lens 27 condenses the light beam that has passed through the beam splitter 26 and applies this light beam to the CD-R. The condensing lens 28 condenses the light beam reflected from the CD-R and reflected again by the beam splitter 26. The photosensor 29 receives the light beam the condensing lens 28 has condensed.

To reproduce the data from the CD-R, the semiconductor laser 24 emits a 780 nm light beam the intensity of which has been controlled. The collimator lens 25 converts this light beam to a parallel beam. The parallel beam passes through the beam splitter 26 and travels to the objective lens 27. The objective lens 27 condenses the input beam, increasing the intensity thereof in accordance with its numerical aperture NA that is either 0.5±0.01 or 0.55±0.01. The light beam thus condensed by the lens 27 is applied to the CD-R that the spindle motor 21 is rotating. The light beam forms a light spot, which moves along the train of pits that represent the data recorded on the CD-R.

The light beam is reflected from the CD-R. The light beam reflected from the CD-R contains components that correspond to the data signal recorded on the CD-R. This is because each part of the CD-R has reflectance equal to or different from the reflectance of any other part, in accordance whether it has a pit or not or how long the pit is if it has one, and the light beam reflected from each part of the CD-R therefore has intensity equal to or different from that of the light beam reflected from any other part of the CD-R.

The light beam containing the signal components passes through the objective lens 27 and travels to the beam splitter 26. The beam splitter 26 reflects this light beam, which is applied to the condensing lens 28. The condensing lens 28 condenses the light beam, which is applied to the photodetector 29. The photodetector 29 has, for example, a two-segment light-receiving section. The light-receiving section converts the light beam into an electric current and then converts the electric current to a voltage signal. The voltage signal has a magnitude that corresponds to the intensity of the light beam reflected from the CD-R. The voltage signal generated by the photodetector 29 is supplied to the RF amplifier section 30 that is incorporated in the optical disc drive 20.

The RF amplifier section 30 generates various signals from the voltage signal supplied from the photodetector 29 of the optical pickup 23. To be more specific, the section 30 generates a data signal (RF signal), a focusing-error signal, a tracking-error signal, and a wobble signal. As FIG. 10 shows, the optical disc drive 20 further comprises an equalizer 31, a servo control section 32, an ATIP decoder 33, a control section 34, a binary/clock generating section 35, a data processing section 36, a two-shaft driver 37, an interface 38, a laser driver 39, and a ROM 40. The equalizer 31 receives the data signal. The servo control section 32 receives the focusing-error signal and the tracking-error signal. The ATIP decoder 33 receives the wobble signal.

The equalizer 31 performs equalizing on the data signal supplied from the RF amplifier section 30, thereby correcting the waveform of the data signal. The equalizer 31 can have its characteristic altered to one appropriate to process the signal reproduced from the double-density CD-R 10B. The data signal thus processed by the equalizer 31 is supplied to the binary/clock generating section 35.

The binary/clock generating section 35 converts the signal supplied from the equalizer 31 to digital data. The digital data is supplied to the data processing section 36. The binary/clock generating section 35 also generates a clock signal that is synchronous to the digital data. The clock signal is supplied to the data processing section 36, together with the digital data.

The servo control section 32 generates a control signal from the focusing-error signal and tracking-error signal, both supplied from the RF amplifier section 30. The control signal is supplied to the two-shaft driver 37 to accomplish focusing control and tracking control.

In accordance with the control signal supplied from the servo control section 32, the two-shaft driver 37 drives the two-shaft actuator (not shown) that holds the objective lens 27 of the optical pickup 23. As the driver 37 drives the actuator, the objective lens 27 is moved toward or away from the CD-R and in the radial direction of the CD-R. The focusing control and the tracking control are thereby carried out.

The ATIP decoder 33 operates under the control of the control section 34, demodulating the wobble signal supplied from the RF amplifier section 30 and generating an ATIP wobble signal which is time-axis data. The ATIP wobble signal is supplied to the control section 34. The control section 34 controls the access control section (not shown) in accordance with the ATIP wobble signal. The optical pickup 23 is thereby moved to the target track of the CD-R.

The data processing section 36 operates under the control of the control section 34, EFM-demodulating the digital data supplied from the binary/clock generating section 35 and de-interleaving the digital data or correcting the digital data by using a CIRC (Cross Interleave Reed-Solomon Code). Moreover, the data processing section 36 de-scrambles the digital data or corrects the digital data by using an ECC (Error Correcting Code). The data processing section 36 extracts a sub-code from the data that has been EFM-demodulated. The sub-code is supplied to the control section 34.

The data subjected to error correction in the data processing section 36 is stored into a buffer memory such as a RAM. The data is then supplied, as reproduced data, to a host computer or the like through the interface 38.

The host computer may supply data to be recorded on the CD-R, to the buffer memory (e.g., RAM) provided in the optical disc drive 20. If so, the data processing section 36 reads the data from the buffer memory and encodes the same in a prescribed sector format. The section 36 then adds an ECC (Error Correcting Code) to the data. Further, the section 36 performs CIRC encoding and FM modulation on the data, generating a write signal. The write signal is supplied from the data processing section 36 to the laser driver 39.

Under the control of the control section 34 the laser driver 39 drives the semiconductor laser 24 of the optical pickup 23 in accordance with the write signal supplied from the data processing section 36. Thus driven, the semiconductor laser 24 emits a light beam modulated by the data to be recorded on the CD-R. The objective lens 27 condenses the light beam, which is applied to the CD-R the spindle motor 21 is rotating. A train of pits representing the data is thereby formed in the surface of the recording layer 2 (FIG. 2). Thus, the data is recorded on the CD-R.

The control section 34 is connected to the ROM 40. The ROM 40 stores control programs for controlling the other components of the optical disc drive 20. The control section 34 determines whether the CD-R attached to the spindle motor 21 is a single-density CD-R or a double-density CD-R, from the pattern of the synchronization signal SYNC that is contained in the ATIP wobble signal supplied from the ATIP decoder 33. In accordance with the control program for recording and reproducing data on and from a CD-R of the type it has determined, the control section 34 controls the other components of the optical disc drive 20.

The control section 34 may determine that the disc attached to the spindle motor 21 is a single-density CD-R 10A. If so, the section 34 generates a control signal for recording and reproducing data on and from the single-density CD-R 10A. The control signal is supplied to the motor control section 22. The motor control section 22 controls the spindle motor 21 in accordance with the control signal. Thus controlled, the spindle motor 21 rotates the single-density CD-R 10A at a linear velocity of 1.2±0.02 m/sec. Alternatively, the control section 34 may determine that the disc attached to the spindle motor 21 is a double-density CD-R 10B. In this case, the section 34 generates a control signal for recording and reproducing data on and from the double-density CD-R 10B. This control signal is supplied to the motor control section 22. The motor control section 22 controls the spindle motor 21 in accordance with this control signal. Thus controlled, the spindle motor 21 rotates the double-density CD-R 10B at a linear velocity of 0.9±0.02 m/sec.

To record data on the double-density CD-R 10B by means of the optical disc drive 20, the PCA described above is used to adjust the power of the data-recording laser beam.

The PCA is provided in the lead-in area of the double-density CD-R 10B. Hence, to record data on the double-density CD-R 10B, the optical pickup 23 is moved to the innermost track of the CD-R 10B and reads the count area, thereby finding an empty test area.

The optical pickup 23 writes, on trial, a data signal in the empty test area. Thereafter, the optical pickup 23 reads the data signal from the test area and supplies the data signal to the data processing section 36. The section 36 measures the symmetry of the data signal, thus obtaining the optimal power for the data-recording laser beam. The data representing the optimal power is supplied to the control section 34. In accordance with this data, the control section 34 controls the laser driver 39. Thus controlled, the laser driver 39 drives the semiconductor laser 24, which emits a light beam that has the optimal power.

Thereafter, the optical pickup 23 is moved to a position right above the user data region of the double-density CD-R 10B. Then, the optical pickup 23 applies the CD-R 10B, writing a data signal in the user data region.

The power of the data-recording beam must be adjusted every time a data signal is written on the double-density CD-R 10B. Even if the recording density is raised and data is written a greater number of times, the power can be adjusted every time data is written on the CD-R 10B. This is because the power of the data-recording laser beam can be adjusted 1000 times in the present invention. Thus, the amount of data that may be recorded on the optical disc is not limited at all.

How data is recorded on a double-density CD-R 10B has been described. Nevertheless, the present invention is not limited to double-density CD-Rs.

Rather, the invention can be applied to other types of optical discs, such as CD-RWs, which can record data signals.

Nor is the recording density limited to twice the recording density of the existing CD-Rs. The present invention can be applied to optical disc that has other recording densities higher than that of the existing CD-Rs. In the case of such an optical disc, the number of test areas is not limited to 800 to 1200; the number of test areas can be increased in proportion to the recording density.

What is claimed is:

1. An optical disc having a power calibration area for calibrating the power of a data-recording laser beam, wherein the power calibration area is provided at an inner peripheral part of the disc and comprises test areas and count areas, the test areas are provided to accomplish trial writing of data, the count areas are provided to record data representing use condition of the test areas, and a number of the test areas is increased in accordance with an increase in recording density of the optical disc.

2. The optical disc according to claim 1, which is applied to double density CD-format whose recording density is about twice as high as the recording density of existing CD format, and in which 800 to 1200 test areas are provided in the power calibration area.

3. The optical disc according to claim 1, wherein the test areas have a size equivalent to two of absolute time in pregroove (ATIP) information frames recorded in a pregroove formed on one surface of the optical disc.

4. The optical disc according to claim 1, wherein the number of test areas corresponding to one count area is an integer smaller than the number of test areas arranged in one circumference of the optical disc.

5. The optical disc according to claim 4, wherein the number of test areas corresponding to one count area is an integer ranging from 2 to 16.

6. The optical disc according to claim 5, wherein the number of test areas corresponding to one count area is an integer selected from the group consisting of 2, 4, 8 and 16.

7. The optical disc according to claim 1, which is CD-formatted and has the recording density about twice as high as the recording density of the optical disc of the existing CD format, and in which the test areas are smaller than the test areas provided on the optical disc of the existing CD format.

8. An optical disc having a pregroove wobbling at a predetermined frequency and a power calibration area for calibrating the power of a data-recording laser beam, wherein the power calibration area is provided at an inner peripheral part of the optical disc and comprises test areas and count areas, the test areas are provided to accomplish trial writing of data, the count areas are provided to record data representing the use condition of the test areas, and a number of the test areas ranges from 800 to 1200.

9. The optical disc according to claim 8, wherein the test areas have a size equivalent to two of ATIP information frames recorded in the pregroove.

10. The optical disc according to claim 8, wherein the number of test areas corresponding to one count area is an integer smaller than the number of test areas arranged in one circumference of the optical disc.

11. The optical disc according to claim 10, wherein the number of test areas corresponding to one count area is an integer ranging from 2 to 16.

12. The optical disc according to claim 11, wherein the number of test areas corresponding to one count area is the integer selected from the group consisting of 2, 4, 8 and 16.

13. The optical disc according to claim 8, wherein the number of the count areas is smaller than the number of the test areas.

14. The optical disc according to claim 8, which is CD-formatted and has the recording density about twice as high as the recording density of the optical disc of the existing CD format, and in which the test areas are smaller than the test areas provided on the optical disc of the existing CD format.

15. A data recording apparatus for recording data on an optical disc by calibrating the power of a data recording laser beam, said optical disc having a calibration area which is provided at an inner peripheral part of the optical disc and which comprises test areas for accomplishing trial writing of data and count areas for recording data representing use condition of the test areas, said apparatus comprising:

an optical head for irradiating light to the optical disc and detecting the light reflected from the optical disc;

a controller for controlling the power of the light to be emitted from the optical head, in accordance with an output of the optical head; and discriminating means for discriminating a type of the optical disc in accordance with the output of the optical head, wherein the recording density of the optical disc is determined based on the type of the optical disc discriminated by the discriminating means, and the size of the test areas is changed in accordance with the determined recording density, thereby to calibrate the power of the data recording laser beam.

16. The data recording apparatus according to claim 15, wherein the optical disc is selected from a first type and a second type of the optical discs wherein the first type of the optical disc comprises 100 to 500 test areas and the second type of the optical disc has the recording density about twice as high as the recording density of the first type of the optical disc and comprises 800 to 1200 test areas.

17. The data recording apparatus according to claim 15, wherein the optical disc is selected from two types of the optical discs wherein the first type of the optical disc comprises test areas which have a size equivalent to 3 to 15 ATIP information frames recorded in a pregroove formed on one surface of the optical disc, and the second type of the optical disc comprises has the recording density which is about twice as high as the recording density of the disc of the first type and comprises test areas which have a size equivalent to two of ATIP information frames recorded in the pregroove formed on one surface of the optical disc.

18. The data recording apparatus according to claim 15, wherein in the optical disc, the number of test areas corresponding to one count area is an integer smaller than the number of test areas arranged in one circumference of the optical disc.

19. The data recording apparatus according to claim 18, wherein the optical disc is characterized in that the number of test areas corresponding to one count area is an integer ranging from 2 to 16.

20. The data recording apparatus according to claim 19, wherein in the optical disc, the number of test areas corresponding to one count area is the integer selected from the group consisting of 2, 4, 8 and 16.

21. A data recording method for recording data on an optical disc by calibrating the power of a data recording laser beam, wherein the optical disc comprises a calibration area provided at an inner peripheral part of the optical disc and comprising test areas for accomplishing trial writing of data and count areas for recording data representing the use condition of the test areas, wherein the number of the test areas is increased in accordance with an increase in the recording density of the optical disc.

22. The data recording method according to claim 21, wherein the optical disc is applied to a double-density CD-format and comprises 800 to 1200 test areas.

23. The data recording method according to claim 21, wherein the test areas have a size equivalent to two of ATIP information frames recorded in a pregroove.

24. The data recording method according to claim 21, wherein the number of test areas corresponding to one count area is an integer smaller than the number of test areas arranged in one circumference of the optical disc.

25. The data recording method according to claim 24, wherein the number of test areas corresponding to one count area is an integer ranging from 2 to 16.

26. The data recording method according to claim 25, wherein the number of test areas corresponding to one count area is an integer selected from the group consisting of 2, 4, 8 and 16.

* * * * *